United States Patent [19]

Daffé

[11] Patent Number: 5,133,237
[45] Date of Patent: Jul. 28, 1992

[54] DIE PUNCH

[76] Inventor: Erich Daffé, 931 Perry Dr., Algonquin, Ill. 60102

[21] Appl. No.: 698,392

[22] Filed: May 10, 1991

[51] Int. Cl.$^5$ .......................... B26D 7/26; B26F 1/14
[52] U.S. Cl. ........................................ 83/684; 83/140; 83/686; 83/698
[58] Field of Search ................. 83/684, 685, 686, 690, 83/698, 140

[56] References Cited

U.S. PATENT DOCUMENTS

| | | | |
|---|---|---|---|
| 770,239 | 9/1904 | Lovejoy | 83/686 |
| 2,087,186 | 7/1937 | Freeman, Jr. | 83/684 X |
| 2,172,272 | 9/1939 | Booth | 83/687 |
| 2,580,366 | 12/1951 | Smith | 83/686 |
| 3,272,051 | 9/1966 | Actis | 83/527 |
| 3,496,818 | 2/1970 | Porter et al. | 83/685 X |
| 3,742,804 | 7/1973 | Patterson et al. | 83/686 X |
| 3,763,732 | 10/1973 | Stursberg | 83/698 X |
| 4,372,183 | 2/1983 | Lehtinen | 83/916 X |
| 4,487,566 | 12/1984 | Barna | 83/684 X |
| 4,558,616 | 12/1985 | Sakanoto | 83/399 |

*Primary Examiner*—Douglas D. Watts
*Assistant Examiner*—Eugenia A. Jones
*Attorney, Agent, or Firm*—Mathew R. P. Perrone, Jr.

[57] ABSTRACT

A three-piece, die punch has an upper body fixed in the die, a changeable quill, and a lower body to hold the changeable quill in the die punch.

17 Claims, 3 Drawing Sheets

DIE PUNCH

The invention relates to a die punch, and more particularly to a die punch having a tip, which can be replaced while the die is in a press without the disassembling of the die or the punch press.

BACKGROUND OF THE INVENTION

A common device used in manufacturing is a punch press. Into the punch press is secured a die. Before the die is clamped or otherwise secured into the punch press, a die punch is secured in the die.

The punch press efficiently causes apertures to form in metal, a sheet of other material, or other substrates. By causing these apertures to form, in an efficient manner, great advantages are obtained. The efficiency of creating these apertures, provides for great increase in production.

However, the actual punch itself is a major weakness in this efficiency. For example, to change the size of the punch itself, major disassembly of the die and press is required. Such a time consuming process is inherently a major problem, causing substantial machine downtime. A machine is only profitable when it is up and running.

Furthermore, the die punch itself is the most fragile part of the punch press and die contained therein, and has a tendency to break. When the die punch breaks, it is required to disassemble the entire press and the die secured therein, replace the punch, and reassemble the press with the die therein before manufacturing can begin again. This procedure is very time consuming.

Such a time delay, of course, is grossly inefficient. Such inefficiency leads to a lack of profitability. It also leads to delay and down time for the machine. It is desired however, to replace this punch in an efficient fashion. To date, no suitable device is known to accomplish this purpose.

A common device used for this matter is a ball lock punch which requires a ball lock retainer. With the ball lock retainer, the punch becomes too bulky to be used in a confined die punching device. A ball lock punch is not easily installed on a perforator and a puncher in the same retainer plate. In addition, the replacement perforator is more efficient and less expensive than the ball lock punch. Thus, the ball lock punch is not an efficient replacement mechanism for a die punch.

SUMMARY OF THE INVENTION

Therefore, among the many objectives of this invention is to provide a die punch which can be changed, with minimized disassembly of the punch press and die.

A further objective of this invention is to provide a die punch which can be repaired, with minimized disassembly of the punch press and die.

A still further objective of this invention is to provide a die punch which can be replaced, with minimized disassembly of the punch press and die.

Yet a further objective of this invention is to provide a die punch which minimizes down time of the punch press and die.

Also an objective of this invention is to provide a die punch which minimizes the use of the ball lock retainer.

Another objective of this invention is to provide a die punch which can be repaired, with minimized disassembly of the die.

Still another objective of this invention is to provide a die punch which can be replaced, with minimized disassembly of the die.

Yet another objective of this invention is to provide a die punch which minimizes down time of the die.

These and other objectives of the invention (which other objectives become clear by consideration of the specification, claims and drawings as whole) are met by providing a three-piece, die punch having an upper body fixed in the die, a changeable quill, and a lower body to hold the changeable quill in the die punch.

BRIEF DESCRIPTION OF THE DRAWINGS

Throughout the Figures of drawing where the same part appears in more than one Figure of the drawing, the same numeral is applied thereto.

DESCRIPTION OF THE PREFERRED EMBODIMENTS

A die punch with simplified punch changing is achieved by inserting a three piece die punch into a die. The die can then be secured in a punch press. This upper body has a body head at one end to be received in the punch retainer plate of the die, and a threaded opening at the other end oppositely disposed from the body head. The body head has two oppositely disposed flat sides so that the body head is received in the retainer plate without turning. The threaded opening terminates in a punch head receiving case within the upper body.

Female threads are adjacent punch head receiving case. At the edge of the threaded opening and adjacent to the female threads is a hollow cylindrical bearing surface. The female bearing surface leads from the threaded opening to the female threads to the punch head receiving case.

Into this punch head receiving case can fit the head of a quill punch. Around the quill punch a lower body is inserted and put in threaded relation with the upper body. In this fashion, the quill punch is held in position.

With a common head size for the quill punch of different diameters and a common diameter change in the lower body to receive the quill punch the quill punch can easily be changed. All that is required is to remove the lower body, remove the broken quill punch and replace it with a new one. It is also very easy to change sizes of punch with this modification. The upper body does not have to be changed. The lower body need only be removed, the quill punch changed, and the lower body reattached. This procedure permits a very simple and efficient change in the quill punch.

The lower body fits into the upper body in a male female relationship and is held therein by the male threads of the lower body meshing with the female threads of the upper body. Adjacent the male threads of the lower body is a male bearing surface machined to smoothly, but tightly, fit with the female bearing surface.

Centrally located in the lower body is a quill aperture capable of receiving the base of the quill punch. The base, of course, of the quill punch is of lesser diameter than the head. Thus, the lower body at the termination thread point receives the head and holds the head in position within the upper body. In this fashion, the efficient changing of the quill punch can be achieved.

The male bearing surface is the center portion of the outer surface of the lower body. On one side of the male bearing surface is the male threaded portion. On the other side of the male bearing surface is a wrench receiving portion. The wrench receiving portion can receive a socket wrench especially designed therefor to remove or insert a quill punch.

Figure 1:
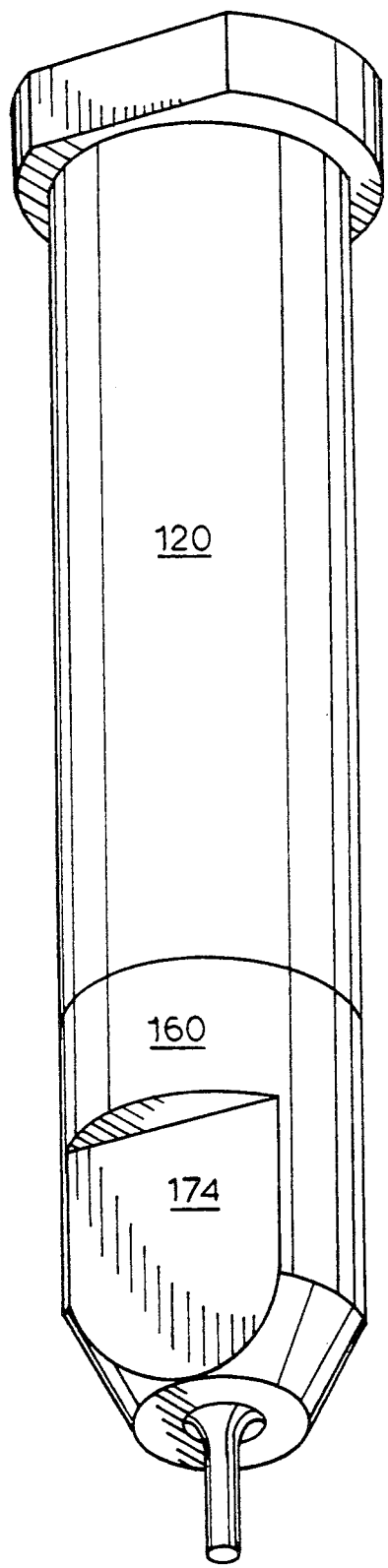
FIG. 1 depicts a perspective view of the die punch 100 of this invention.
Figure 4:
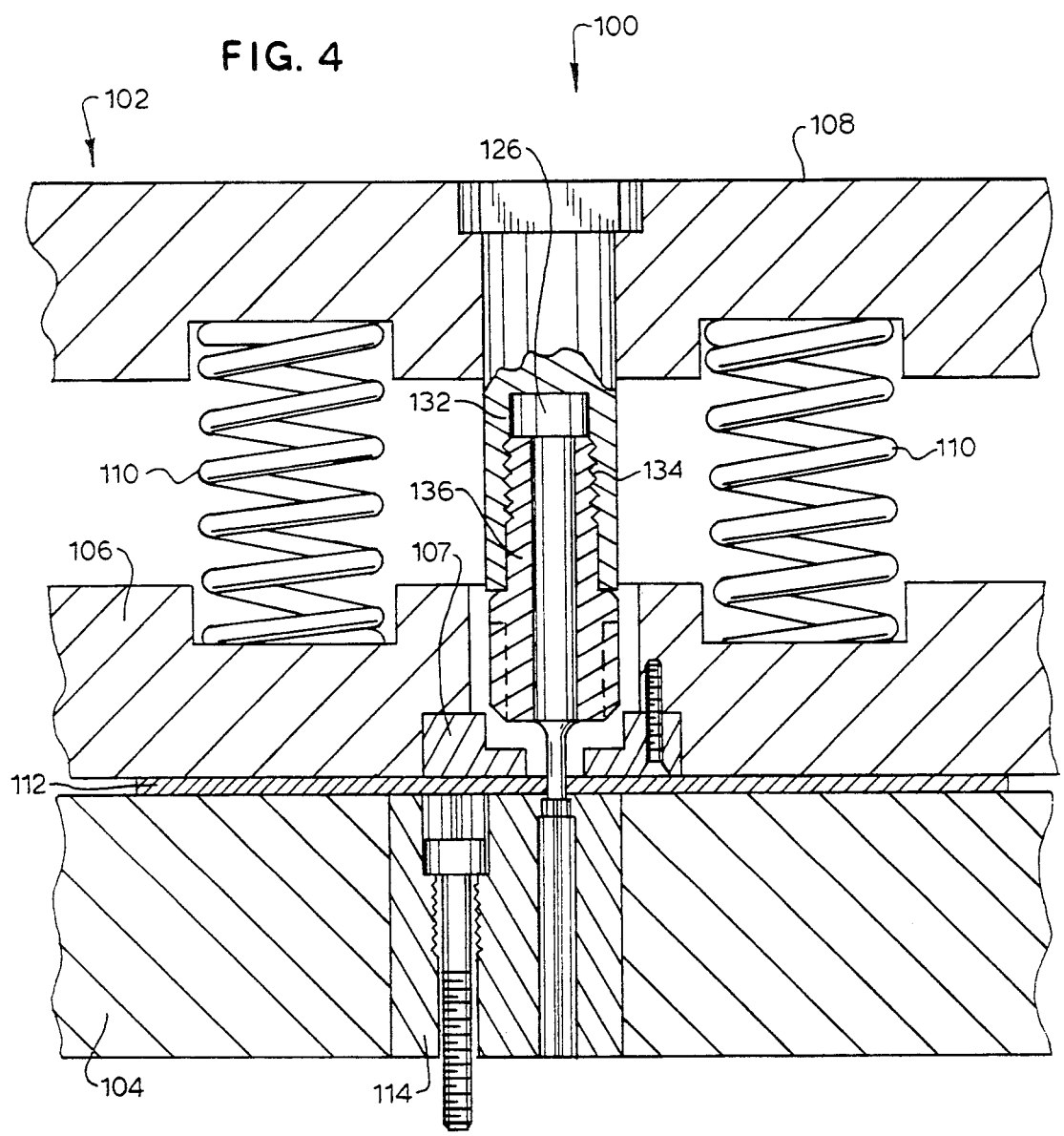
FIG. 4 depicts a side, partially cross-sectioned view of the die punch 100 of this invention inserted in a die 102.

Referring now to FIG. 1 and FIG. 4, die punch 100 is mounted in die 102. Die 102 is then mounted into a punch press (not shown). Die 102 is a standard device well-known in the art. Included in die 102 are dieblock 104, stripper plate 106, punch retainer plate 108, and die springs 110. Die block 104 forms the base for the die 102 to be secured in the punch press (not shown). Adjacent to die block 104 is stripper plate 106. Between die block 104 and stripper plate 106 is the sheet 112, on which work is being done, and in which apertures are formed by die punch 100. Stripper plate 106 is connected to punch retainer plate 108 by springs 110.

Figure 2:
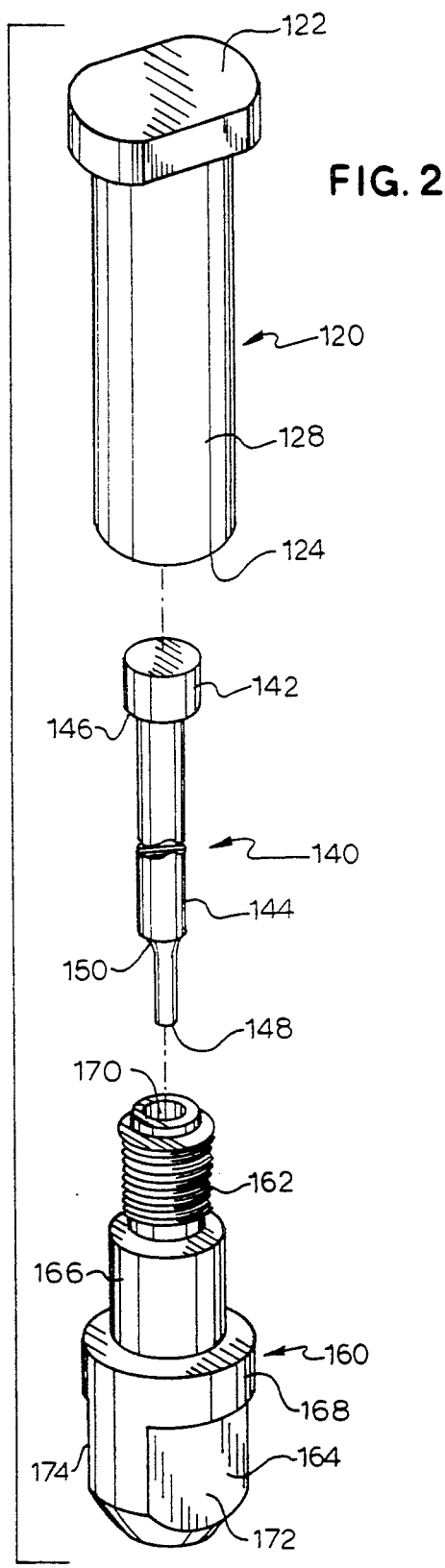
FIG. 2 depicts an exploded perspective view of the die punch 100 of this invention.
Figure 3:
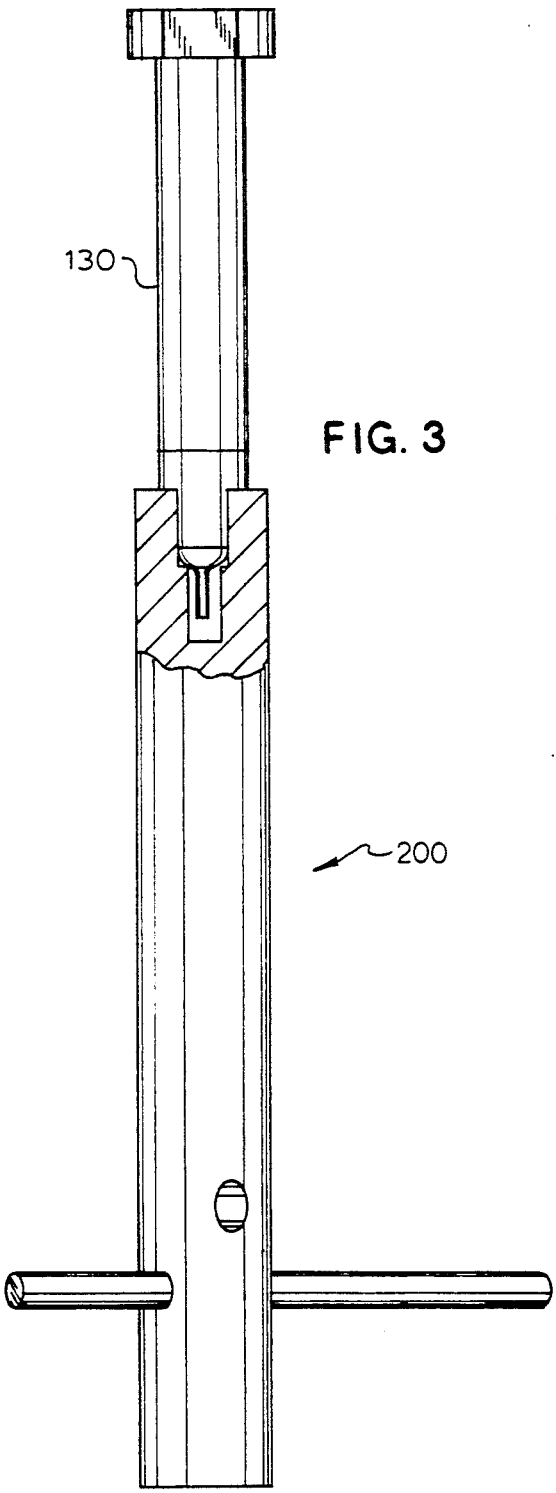
FIG. 3 depicts a side, partially cross-sectioned view of the die punch 100 of this invention used with wrench 200.

By considering FIG. 2 and FIG. 3, die punch 100 includes an upper body 120, quill punch 140 of die 102 and lower body 160. Upper body 120 is inserted in the punch retainer plate 108 to act as a holding device. The upper body 120 has a body head 122 at one end to be received in the punch retainer plate 108 and a female threaded opening 124 at the other end oppositely disposed from body head 122.

The body head 122 further has a first flat side 126 and a second flat side 128 oppositely disposed therefrom so that the longitudinal axes thereof are mutually parallel to each other, and perpendicular to the cylindrical axis of the upper body 120. First flat side 126 and second flat side 128 are provided to assist in the securing of die punch 100 in general and upper body 120 in particular into punch retainer plate 108. However, body head 122 may be shaped in any suitable fashion as required in order to be secured into punch retainer plate 108.

Referring now to FIG. 2, FIG. 3, FIG. 4 and FIG. 6, the threaded opening 124 terminates in an outwardly appearing cylindrical body 130. The cylindrical body 130 has a diameter less than the diameter of body head 122 to provide for fitting into punch retainer plate 108. The threaded opening 124 terminates internally in a punch head receiving case 132.

Female threads 134 are adjacent to punch head receiving case 132 within upper body 120. At the edge of the threaded opening 124, and adjacent to the female threads 134 and oppositely disposed from punch head receiving case 132 while also being within upper body 120 is a female bearing surface 136. The female bearing surface 136 leads from the threaded opening 124 to the female threads 134 to the punch head receiving case 132.

Into threaded opening 124 and especially in punch head receiving case 132 fits the punch head 142 of quill punch 140. Extending from punch head 142 is punch rod 144 which punches the aperture in sheet 112. Punch rod 144 is cylindrical in nature, or other desired aperture shape, and of less diameter than punch head 142. Punch rod 144 has a head end 146 secured to, or as an integral part of, punch head 142. Oppositely disposed from head end 146 is forming end 148, which contacts sheet 112 and forms the aperture therein.

While the drawing shows forming end 148 as circular in nature, it must be clear that forming end may be shaped to form any suitable aperture. Typically, forming end 148 may be polygonal, ellipsoidal or any other suitable shape.

Punch head receiving case 132 joins with punch head 142 in a female-male relationship. It follows that receiving case 132 and punch head 142 are appropriately shaped. The disclosed shape is cylindrical, although other shapes therefor are operable.

Around the punch rod 144, a generally cylindrical lower body 160 is mounted. Lower body 160 has a male threaded end 162 capable of tightly fitting into threaded relation with female threaded opening 124. Oppositely disposed from male threaded end 162 is gripping end 164. Gripping end 164 is shaped to permit a wrench 200 to attached thereto for insertion into or removal from upper body 120. In this fashion, the quill punch 140 is held in position by this joinder of lower body 160 and upper body 120.

Figure 5:
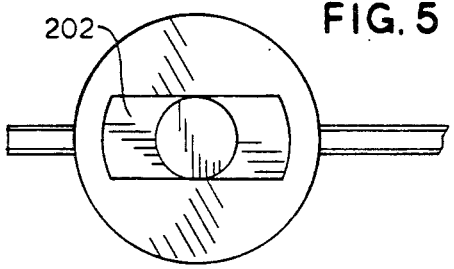
FIG. 5 depicts a bottom view of a wrench 200 for use with the die punch 100 of this invention.
Figure 6:
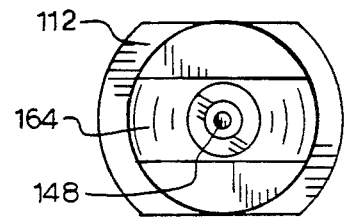
FIG. 6 depicts a bottom view of the die punch 100 of this invention.

As can be seen in FIG. 3, FIG. 4 and FIG. 5, gripping end 164 may have special shape to fit into a special wrench 200. Wrench 200, as shown in FIG. 5, has a female wrench receiver 202 designed to receive therein gripping end 164 of lower body 160. Such a design for gripping end 164 and wrench 200 greatly simplifies replacing quill punch 140, whether the replacement is due to the breaking of quill punch 140 or a need to change the size thereof. Wrench receiver 202 is essential to provide access to gripper end 164 thru tight quarters.

Die block 104 includes a removable die insert 114. Stripper plate 106 also includes a removable stripper insert 107. Die insert 114 and stripper insert 107 are well known in the punch press art. Removable stripper insert 107 is changable to adjust to the punch size.

Between gripping end 164 and the male threaded end 162 of the lower body 160 is a male bearing surface 166 machined to smoothly, but tightly fit with the female bearing surface 136. Gripping end 164 is generally of a somewhat larger diameter than male bearing surface 166 and male threaded end 162, thereby forming lip 168 therebetween. Lip 168 provides a stopping limit for fitting male threaded end 162 into female threaded opening 124.

Axially corresponding to the cylindrical axis of lower body 160, is receiving tube 170 in lower body 160. Into receiving tube 170 is inserted punch rod 144. Punch rod 144 is of sufficient length to slightly extend from tube 170 at gripping end 164. In this manner, forming end 148 may penetrate sheet 112.

With a common head size for punch head 142 of quill punch 140, different diameters for punch rod 144 and a corresponding diameter change for receiving tube 170 in the lower body 160 to receive the quill punch 140 permits simplified replacement of punch rod 144. All that is required is to remove the lower body 160, remove the broken or otherwise changeable quill punch 140 and replace the same.

Also feasible, a tapered section 150 of punch rod 144 may be formed adjacent to forming end 148. In this fashion, a main body of punch rod 144 is a standard diameter eliminating the need for a variety of lower body 160 with a different receiving tube 170. Tapered section 150 may provide the different required shapes for an aperture. In this case, only one diameter of receiving tube 170 is required.

Gripping end 164 is preferably similar to body head 122. Gripping end 164 has a first grip side 172 and a second grip side 174. Both first grip side 172 and second grip side 174 are flat. Like first flat side 126 and second flat side 128 of body head 122 further has a first flat side 126 and a second flat side 128, first grip side 172 and second grip side 174 are oppositely disposed and are provided to receive wrench 200. Wrench 200 is generally required because of the tight punch press area.

It is also very easy to change sizes of quill punch 140 with this modification. The upper body 120 does not have to be changed. This structure permits a very simple and efficient change of the quill punch 140.

This application—taken as a whole with the specification, claims, abstract, and drawings1'provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A die punch having three parts including an upper body, a lower body, and a quill punch retained within said die punch wherein:
   a. said upper body includes an upper body cavity;
   b. said lower body includes a lower body cavity;
   c. said upper body cavity combines with said lower body cavity to form a quill punch receiving cavity, so that said quill punch is retained within said die punch;
   d. said upper body and said lower body are removably joinable to secure said quill punch in said quill punch receiving cavity;
   e. said lower body includes a male threaded section at one end thereof and a male, ground bearing surface adjacent to said male threaded section;
   f. said upper body includes a upper body head at one end thereof and a cylindrical portion including a threaded opening at the other end thereof;
   g. said upper body cavity includes on the interior thereof at said threaded opening a female, ground bearing surface and a female threaded surface adjacent to said female, ground bearing surface and within said upper body cavity;
   h. said die punch has said female, ground bearing threaded surface in contact with said male, ground bearing surface when said die punch is assembled;
   i. said quill punch includes a head which fits into a head receiving section within said upper body cavity of said upper body and a quill for extending down through an axial tubular member within said lower body cavity of said lower body;
   j. said lower body tightens in said upper body to hold said quill in position;
   k. said lower body has a first lower flat side and a second lower flat side to assist in removing said lower body from said upper body, in order to replace or change said quill punch; and
   l. said first lower flat side is oppositely disposed from said second lower flat side.

2. The die punch of claim 1, wherein:
   a. said upper body head has a first flat side and a second flat side oppositely disposed therefrom to provide a holding mechanism for said upper body head within a punch retainer plate;
   b. said upper body head has a diameter greater than a diameter of said cylindrical portion of said upper body; and
   c. said threaded opening is oppositely disposed from said upper body head.

3. The die punch of claim 2, wherein:
said lower body includes a stop lip adjacent to said male ground bearing surface to contact an edge of said threaded opening of said upper body.

4. The die punch of claim 1, wherein:
   a. said upper body head has a first flat side and a second flat side oppositely disposed therefrom to provide a holding mechanism for said upper body head within a punch retainer plate;
   b. said upper body head has a diameter greater than a diameter of said cylindrical portion of said upper body.

5. The die punch of claim 4, wherein
said lower body includes a stop lip adjacent to said male ground bearing surface to contact an edge of said threaded opening of said upper body.

6. The die punch of claim 1, wherein
said lower body includes a stop lip adjacent to said male ground bearing surface to contact an edge of said threaded opening of said upper body.

7. The die punch of claim 6, wherein:
   a. said upper body has a first flat side and a second flat side oppositely disposed therefrom to provide a holding mechanism for said upper body head within a punch retainer plate; and
   b. said upper body head has a diameter greater than a diameter of said cylindrical portion including a threaded opening at the other end thereof.

8. The die punch of claim 7, wherein:
   a. said quill punch has a tapered section adjacent to a forming end;
   b. said tapered section determines the size and shape of the aperture being formed by said quill punch; and
   c. said forming end is oppositely disposed from said punch head.

9. The die punch of claim 1, wherein
   a. said quill punch has a tapered section adjacent to a forming end; and
   b. said tapered section determines the size and shape of the aperture being formed by said quill punch.

10. The die punch of claim 9, wherein said forming end is circular.

11. The die punch of claim 9, wherein said forming end is polygonal.

12. The die punch of claim 9, wherein said forming end is ellipsoidal.

13. In a punch press, having a die operably secured therein, said die having an easily changeable die punch, the improvement wherein said die punch has three parts and includes an upper body and a lower body, and a quill punch retained within said lower body and said upper body, and further wherein:
   a. said upper body includes an upper body cavity therein;

b. said lower body includes a lower body cavity therein;
c. said upper body cavity combines with said lower body cavity to form a quill punch receiving cavity;
d. said upper body and said lower body are removably joined to secure said quill punch in said quill punch receiving cavity;
e. said lower body includes a male threaded section at one end thereof and a male, ground bearing surface adjacent to said male threaded section;
f. said upper body includes a upper body head at one end thereof and a cylindrical portion including a threaded opening at the other end thereof;
g. said upper body cavity includes on the interior thereof at said threaded opening a female, ground bearing surface and a female threaded surface adjacent to said female, ground bearing surface and within said upper body cavity;
h. said die punch has said female, ground bearing threaded surface and said male, ground bearing surface in contact when said die punch is assembled;
i. said quill punch includes a head which fits into a head receiving section within said upper body cavity of said upper body and a quill for extending down through an axial tubular member within said lower body cavity of said lower body;
j. said lower body tightens in said upper body to hold said quill in position;
k. said lower body has a first lower flat side and a second lower flat side to assist in removing said lower body from said upper body, in order to replace or change said quill punch; and
l. said first lower flat side is oppositely disposed from said second lower flat side.

14. The punch press of claim 13, wherein:
a. said upper body head has a first flat side and a second flat side oppositely disposed therefrom to provide a holding mechanism for said upper body head within a punch retainer plate;
b. said upper body head has a diameter greater than a diameter of said cylindrical portion of said upper body.

15. The punch press of claim 14, wherein said lower body includes a stop lip adjacent to said male ground bearing surface to contact an edge of said threaded opening of said upper body.

16. The punch press of claim 15, wherein:
a. said quill punch has a tapered section adjacent to a forming end; and
b. said tapered section determines the size and shape of the aperture being formed by said quill punch.

17. The punch press of claim 13, wherein:
a. said quill punch has a tapered section adjacent to a forming end; and
b. said tapered section determines the size and shape of the aperture being formed by said quill punch.

* * * * *